United States Patent
McKenney, Sr.

(10) Patent No.: US 6,601,337 B1
(45) Date of Patent: Aug. 5, 2003

(54) FLYING INSECT ATTRACTOR AND ERADICATOR

(76) Inventor: Robert T. McKenney, Sr., 1452 Plainfield Ave., Orange Park, FL (US) 32073

( * ) Notice: Subject to any disclaimer, the term of this patent is extended or adjusted under 35 U.S.C. 154(b) by 0 days.

(21) Appl. No.: 10/121,990

(22) Filed: Apr. 12, 2002

(51) Int. Cl.[7] ................................................ A01M 1/20
(52) U.S. Cl. ..................................................... 43/132.1
(58) Field of Search ............................... 43/132.1, 131, 43/107, 114

(56) References Cited

U.S. PATENT DOCUMENTS

| | | | |
|---|---|---|---|
| 3,931,692 A | * | 1/1976 | Hermanson ................... 43/131 |
| 4,168,591 A | * | 9/1979 | Shaw ........................... 43/114 |
| 4,310,985 A | * | 1/1982 | Foster et al. ................... 43/131 |
| 4,802,303 A | | 2/1989 | Floyd, III |
| 4,907,366 A | * | 3/1990 | Balfour ....................... 43/132.1 |
| 4,908,977 A | * | 3/1990 | Foster ........................ 43/107 |
| 5,044,114 A | * | 9/1991 | Haberer ...................... 43/132.1 |
| 5,150,541 A | * | 9/1992 | Foster et al. ................. 43/131 |
| 5,359,808 A | * | 11/1994 | Fitsakis ...................... 43/132.1 |
| 5,595,018 A | | 1/1997 | Wilbanks |
| 5,657,576 A | | 8/1997 | Nicosia |
| 6,088,949 A | | 7/2000 | Nicosia et al. |
| 6,158,668 A | * | 12/2000 | Burgeson ..................... 239/47 |

* cited by examiner

Primary Examiner—Charles T. Jordan
Assistant Examiner—Jordan M Lofdahl
(74) Attorney, Agent, or Firm—Arthur G. Yeager

(57) ABSTRACT

The apparatus includes a bladder having an elastic wall capable of being punctured by proboscis of flying insects and being self-sealing. The bladder is made from VTR rubber and may be made from animal skin as well. The bladder contains diluted liquid insecticide and supports means for heating same. The means for heating includes a power source and a rheostat connected thereto and to a heating coil for regulating the temperature of liquid insecticide. A cage supports the bladder therewithin and at least one hanger is attached to the cage for hanging the apparatus on a limb or the like. A first support member engages the cage and has a passageway for receiving therethrough a neck of the bladder. A plurality of clamps secure the cage to the first support member and a cap removably fits above the passageway for preventing the evaporation of liquid insecticide. In alternate embodiments, the cage only surrounds a lower or upper portion of the bladder.

25 Claims, 3 Drawing Sheets

FLYING INSECT ATTRACTOR AND ERADICATOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an apparatus for attracting and eradicating flying insects and, more particularly, an apparatus having a bladder that is penetrable by flying insects so that same will ingest a liquid insecticide contained therein while having self-sealing capabilities to close the puncture site after the flying insects leave.

2. Prior Art

Insect traps are well known in prior art. Many such devices utilize various poisonous substances to kill insects upon contact. Other devices use a strong adhesive that traps insects, thereby eventually killing them. Other devices simply trap insects in a container that must be emptied periodically, for example, into a toilet or other disposal means. With such devices, care must be given not to let such insects escape while emptying the device. In addition, several prior art insect killing devices utilize a strong electric field into which insects fly and are electrocuted. U.S. Pat. No. 5,595,018 to Wilbanks discloses such a device.

Public attention has recently become more focused on the over utilization of insecticides, toxic chemicals, and the like. Such chemicals are now being shown to cause significant harm when exposed, in high-concentrations, to the environment. Consequently, many people are becoming reluctant to use devices that spray highly concentrated liquid poisonous substances into the atmosphere, such as many insect-controlling devices. For example, U.S. Pat. No. 4,802,303 to Floyd discloses such a device.

Alternately, prior art insect control devices that do not use liquid poisonous substances are generally perceived as less effective or more unsanitary than those devices that contain liquid poisonous substances. For example, devices that utilize a strong adhesive become ridden with dead insects over time. Such devices are not only unsightly, but are arguably unsanitary. Further, strong adhesives of such devices tend to become less effective after exposure to air for an extended period of time. As a result, insects that approach such devices may become repelled from it due to the olfactory recognition of other dead insects or may be able to escape when caught by a weak adhesive.

Deficiencies are also evident in insect traps that require periodic emptying of a reservoir. Not only is such a chore distasteful, but also over time such reservoirs tend to become unsanitary if not properly cleaned. As a consequence, many insects may be repelled from such devices that have not been emptied for some time.

Deficiencies are also evident in insect traps that use electricity to electrocute flying insects. Such insects typically fly between two screens that are oppositely charged, whereby an electric arc travels through the insect from one screen to the other, electrocuting the insect. Such an electric arc tends to make an unpleasant, sometimes startlingly loud noise. Moreover, many people with small children are reluctant to use any apparatus with high voltage for obvious reasons. Such electric devices, moreover, are difficult to mount on a vertical pole, such as a fence post or the like. Mounting such devices from a pole is often more convenient than finding a tree branch or other such horizontal support near an electrical outlet.

Accordingly, there is a need for an insect killing device that remains effective over extended periods of time without spraying highly concentrated liquid poisonous substances into the atmosphere. Such a needed device would be extremely alluring to flying insects, and extremely effective in killing them, yet would not require periodic cleaning or removing of dead insects. Further, such a needed device would be easy to maintain, would be pleasant in appearance, and would not create loud and unpleasant sounds.

BRIEF SUMMARY OF THE INVENTION

In view of the foregoing background, it is therefore an object of the invention to provide an apparatus for attracting and eradicating flying insects having a bladder penetrable by flying insects so that same will ingest a liquid insecticide contained therein. These and other objects, features, and advantages of the invention, are provided by an apparatus for attracting and eradicating flying insects capable of puncturing the skin of humans and animals that may include a bladder having an elastic wall capable of being punctured by proboscis of flying insects. The bladder may be self-sealing after removal of the proboscis of flying insects therefrom. The bladder may also be adapted to contain a diluted liquid insecticide therein for ingestion via such a proboscis. Advantageously, the bladder does not need to be repaired or maintained after flying insects puncture the walls thereof. The apparatus also does not use electrocution or involve the widespread spraying of highly concentrated poisonous chemicals.

The apparatus may further include a cage having an open framework for supporting the bladder therewithin. At least one hanger may be attached to the cage adjacent its upper portion for hanging the apparatus therefrom. Means positioned generally medially in the bladder and for heating diluted insecticide therein may also be provided. The means for heating may include a heating coil for conducting heat and thereby heating the liquid insecticide for attracting flying insects.

The heating coil may be flexible for fitting through a passageway and for expanding within the bladder. A rheostat may be connected to the heating coil for adjusting a temperature of same and a power source may be connected to the rheostat for supplying power to the heating coil. The power source may be AC or DC. The liquid insecticide may be heated to a temperature between about 95 degrees Fahrenheit to 102 degrees Fahrenheit. Advantageously, the apparatus produces and permeates stimuli, which are characteristic of live humans and animals, through the walls of the bladder. Accordingly, the flying insects capable of biting or penetrating the bladder will do so rather than humans or animals.

The cage may have elongated sidewalls with first and second opposed ends and a base connected to the first end. The sidewalls may extend in a generally vertical direction from the base up to the second end. The cage may be made from wire mesh so that the cage is deformably resilient. The wire mesh may be adapted for allowing flying insects to pass therethrough. Advantageously, flying insects that die from the liquid insecticide are not deposited on the apparatus thereby eliminating the need to remove dead flying insects therefrom.

The wall of the bladder may include a plurality of pores therein for communicating scent and heat therethrough to attract the flying insects to the liquid insecticide. Further, the bladder may include a neck along a vertical axis for receiving the liquid insecticides therethrough. The liquid insecticide may contain between about 8 to 10 drops of Diazinon and water mixed therewith. Alternately, the liquid insecticide may contain between about 8 to 10 drops of Lindane and water mixed therewith.

The neck may be formed on top of the bladder so that the liquid insecticide may be poured through the neck and into the bladder in a generally vertical direction. Accordingly, the means for heating the liquid insecticide may pass downwardly through the neck and remain suspended within the bladder. The wall of the bladder may be between about 0.005 inches to 0.020 inches thick. The bladder may be formed from animal skin having a thickness of less than about 0.009 inches. Alternately, the bladder may be formed from VTR rubber having a thickness of less than about 0.013 inches. The bladder may have a portion extending from the neck for securing the bladder within the cage.

The apparatus may further include an first support member connected to the second end of the sidewalls and having an elongate body with parallel sidewalls and top and bottom surfaces. The first support member may include a passageway extending from the top surface down through the body to the bottom surface. The first support member may direct the means for heating down through the neck and into the bladder so that the means for heating does not come into contact with the wall of the bladder. The apparatus may further comprise a cap engaging the top surface. The cap is positioned above and along the passageway for preventing the liquid insecticide from evaporating.

The portion of the bladder extending from the neck may extend outwardly from the passageway and removably attach to the top surface for securing the bladder within the cage. The apparatus may further include a plurality of clamps for connecting the first support member to the cage so that the cage adequately supports the bladder therewithin. The plurality of clamps may selectively engage the first and second opposed ends of the first support member. The apparatus may further include a second support member for receiving the at least one hanger. The second support member may be adapted for suspending the apparatus above ground.

The bladder may have first and second portions so that the cage surrounds the first portion thereby leaving the second portion exposed and not supported within the cage. Alternately, the cage may surround the second portion thereby leaving the first portion exposed and not supported within the cage.

BRIEF DESCRIPTION OF THE SEVERAL VIEWS OF THE DRAWING

The novel features believed to be characteristic of this invention are set forth with particularity in the appended claims. The invention itself, however, as to its organization of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout, and prime and double prime notations are used to indicate similar elements in alternative embodiments.

Figure 1:
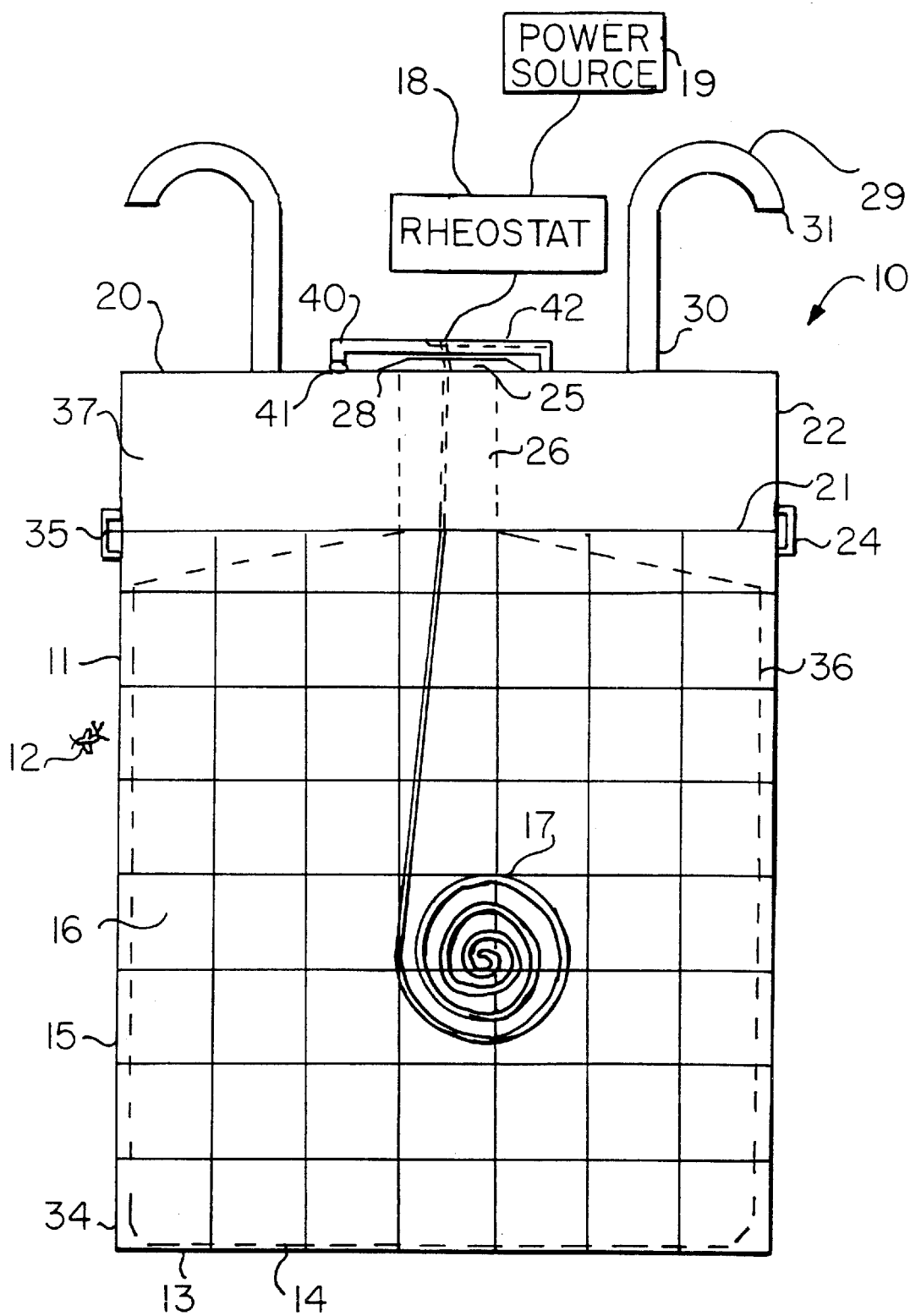
FIG. 1 is a front elevational view showing the apparatus in accordance with the present invention.

Referring initially to FIG. 1, a front elevational view of an apparatus for attracting and eradicating flying insects is shown. The apparatus includes cage 11 formed of wire mesh or hardware cloth and has a generally rectangular shape. The wire mesh pattern is designed for allowing flying insects 12 to pass therethrough. Of course, other patterns and materials known in the art may be used for making cage 11. For example, cage 11 may be made from flexible, plastic cable woven together for forming a similar mesh-like pattern as shown in the present invention. Base 13 of cage 11 is shaped for holding bladder 14 thereon. Bladder 14 has a flexible and stretchable wall 36 for adapting to the general shape of cage 11. The cage has elongated sidewalls 15 that are connected at one end 34 to base 13 and, at the other end, to first support member 37. Sidewalls 15 extend upwardly from base 13 and in a substantially parallel direction for completely surrounding bladder 14. Thus, whether bladder 14 is full or empty, it conforms to the general shape of cage 15. Of course, cage 11 may include other shapes for supporting different bladders therein.

Accordingly, a pragmatic bladder 14 containing liquid insecticide 16 therein for attracting and eradicating flying insects 12 is provided. Elastic wall 36 is sufficiently thin for easier puncturing therethrough by proboscis of flying insects 12. Further, elastic wall 36 provides durability in extreme temperatures because it is less susceptible to heat and ice during the summer and winter months, respectively. Bladder 14 is preferably formed from even slightly porous material for passing moisture therethrough for attracting flying insects 12. Heat and moisture more effectively permeate through thin, elastic wall 36 rather than a thick, rigid wall. Bladder 14 also has self-sealing characteristics for automatically closing a puncture site produced by the proboscis with needle-like organs of flying insects 12. When such flying insects leave the puncture site, bladder 14 will seal the puncture site for allowing other flying insects to penetrate wall 36 for ingesting liquid insecticide 16.

Advantageously, because flying insects 12 create very small holes at the puncture sites and because bladder 14 has self-sealing properties, the apparatus may not require routine cleaning, filling and replacement of bladder 14, for example. Moreover, bladder 14 will not leak insecticide 16 onto the ground, and humans, animals and vegetation in the vicinity of the apparatus will not be exposed to such insecticide 16. Accordingly, the present invention is environmentally more friendly than many prior art systems.

Bladder 14 may be formed from a rubber-like material having the characteristics noted above. The rubber-like material is VTR rubber and preferably has a thickness of about 0.013 inches. Hecht Rubber Corporation in Jacksonville, Fla. manufactures such a rubber-like material. Other rubber-like materials, having penetrable and self-sealing properties may be used, as available in the industry. Alternate to rubber-like materials, bladder 14 preferably may be formed from animal skin (not shown) such as rabbit skin, deer skin and goat skin, for example. Such animal skins are also elastic and have self-sealing properties. If animal skin is used for making bladder 14, walls 36 of bladder 14 should preferably be about 0.005 inches to 0.020 inches thick for allowing flying insects 12 to penetrate therethrough.

As noted above, bladder 14 contains liquid insecticide 16 therein. The insecticide preferably contains 8–10 drops of either Diazinon or Lindane. Such chemicals are mixed with about one quart of water to form a low concentration. Of course, the concentration may be adjusted as needed. Dilution may be mixed outside bladder 14 and afterwards poured therein. Alternately, the chemicals and water may be individually poured into bladder 14 prior to mixing. The later process may require agitation of bladder 14 such as lightly shaking or squeezing thereof, for example, for adequately mixing such chemicals and water therein.

Other conventional insecticides known in the art may be used to attract and eradicate flying insects 12. However, the concentration should be low enough so that flying insects 12 do not die while still attached to bladder 14. In addition, a low concentration of liquid insecticide 16 is safer for the environment. A low concentration of liquid insecticide 16 is adequate for killing flying insects 12 because liquid insecticide 16 is quickly ingested by flying insects 12 and directly circulated throughout their internal systems. Thus, liquid insecticide 16 is not slowly absorbed through an external organ, which may not eradicate flying insects 12 as quickly as direct ingestion means of the present invention. Further, because a low concentration of liquid insecticide 16 may be used in the present invention, the cost associated with refilling bladder 14 with liquid insecticide 16 is thereby reduced.

Flying insects 12 are attracted to bladder 14 because liquid insecticide 16 contained therein emanates stimuli, such as heat and scent, which are characteristics of living organisms. Accordingly, the present invention may be capable of simulating vibrations and heat dissipated by living skin such as human skin or animal skin, for example. In particular, the stimuli may mimic blood flow and muscle movement beneath the skin, which are very attractive to flying insects as are skin temperatures created by the movement of warm blood throughout the body. These physical effects attract flying insects such as mosquitoes and black flies, for example. Once flying insects detect the stimuli emanating from the bladder, they become motivated to make their way toward the apparatus, and further, to land on the bladder and attempt to bite it. Further, because flying insects such as mosquitoes and black flies are sensitive, the negative effects caused by electric motors, pump noise, or the like are not created.

To generate such stimuli, liquid insecticide 16 must be heated. A means for heating includes heating coil 17, rheostat 18 and power source 19. Heating coil 17 preferably has a spiral-like shape. Other conventional heating rods or coils known in the art may be used. Rheostat 18 is connected to heating coil 17 via conductive leads. Rheostat 18 controls the temperature of heating coil 17 so that liquid insecticide 16 will emanate heat and scent, for attracting flying insects 12 thereto, when heated to approximately the human body temperature of about ninety-five degrees Fahrenheit to one-hundred two degrees Fahrenheit. Such a temperature range may be adjusted as necessary for adapting to weather changes. Rheostat 18 is connected via conductive leads to power source 19. Power source 19 provides alternating current for operating heating coil 17. A conventional electrical extension cord (not shown) may be connected to rheostat 18 for supplying power thereto, for example. Other conventional power sources may be used, such as solar power (not shown) and/or battery power (not shown), for example. Rheostat 18 and power source 19 may be adapted to engage apparatus 10 or may be positioned adjacent to and spaced from apparatus 10.

In summary, heated liquid insecticide 16 creates stimuli for attracting flying insects 12 thereto. As the flying insects reach bladder 14, they puncture therethrough for reaching liquid insecticide 16. They ingest the liquid insecticide and subsequently fly away from bladder 14. Shortly after flying insects 12 have flown away from bladder 14, liquid insecticide 16 kills them. Thus, flying insects 12 do not die while attached to bladder 14. Rather, they die at a distance therefrom, where they fall to the ground and thereby reduce the need to remove dead flying insects from the present invention.

Bladder 14, cage 11 and heating coil 17 are positioned together by first support member 37 on top of second end 35 of sidewalls 15. First support member 37 has a generally rectangular shape thereby conforming to base 13 and is preferably formed of an electrically nonconductive material. Thus, first support member 37 is able to withstand heat without affecting its strength or shape. First support member 37 has an elongated body with parallel sidewalls 22. Sidewalls 22 have a plurality of clamps 24 connected thereto at one end, and to sidewalls 15 of cage 11 at the other end. Clamps 24 are removable and may be securely fastened to sidewalls 15, 22 without needing to locate and operate any tools. Other conventional clamps may be used as known in the art without deviating from the scope of the invention.

Passageway 26 is preferably formed at the center of top surface 20 of first support member 37. Passageway 26 extends from top surface 20 down to bottom surface 21. Passageway 26 preferably has a circular cross-section so that heating coil 17 may extend therethrough with coil 17 located generally medially of bladder 14. Heating coil 17 is sufficiently supported by first support member 37 so that heating coil 17 is spaced from and does not contact wall 36 of bladder 14. Further, portion 28 of bladder 14 extends above top surface 20 of first support member 37 and attaches thereon for securely attaching bladder 14.

Cap 40 is removably position above passageway 26 for preventing evaporation of liquid insecticide 16. Cap 40 is secured to top surface 20 by hinge 41 so that cap 40 may be selectively pivoted about hinge 41 from an open position to a closed position and capable of being securely held in either of such positions. Cap 40 includes a generally elongate slit extending from its perimeter towards the center of same. At the center point of cap 40, a generally circular opening that is insulated is positioned for connecting to an end of the elongate slit 42 so that the leads connecting heating coil 17 to rheostat 18 may be selectively slid along the slit and positioned down through the circular opening.

Accordingly, as cap 40 is moved from a closed position to an open position, the leads connecting the rheostat to the heating coil 17 may slid along the elongate slit to not obstruct the pivoting motion of cap 40. Of course, the upper end of heating coil 17 itself may extend through cap 40 and cap 40 may function to support and suspend heating coil 17 in its approximate mid-position within bladder 14.

At least one hanger 29 may be attached to top surface 20 of first support member 37. Hangers 29 have corresponding first ends 30 connected to top surface 20 and corresponding second ends 31 forming a hook for hanging on a limb or a post (not shown) or the like. Hangers 29 may face opposing directions so that the present invention may be supported by any one of such hangers 29. In an alternate embodiment, hangers 29 may be affixed to sidewalls 15 of cage 11 for supporting same. Hangers 29 may also have other conventional shapes known in the art without deviating from the scope of the invention.

Figure 2:
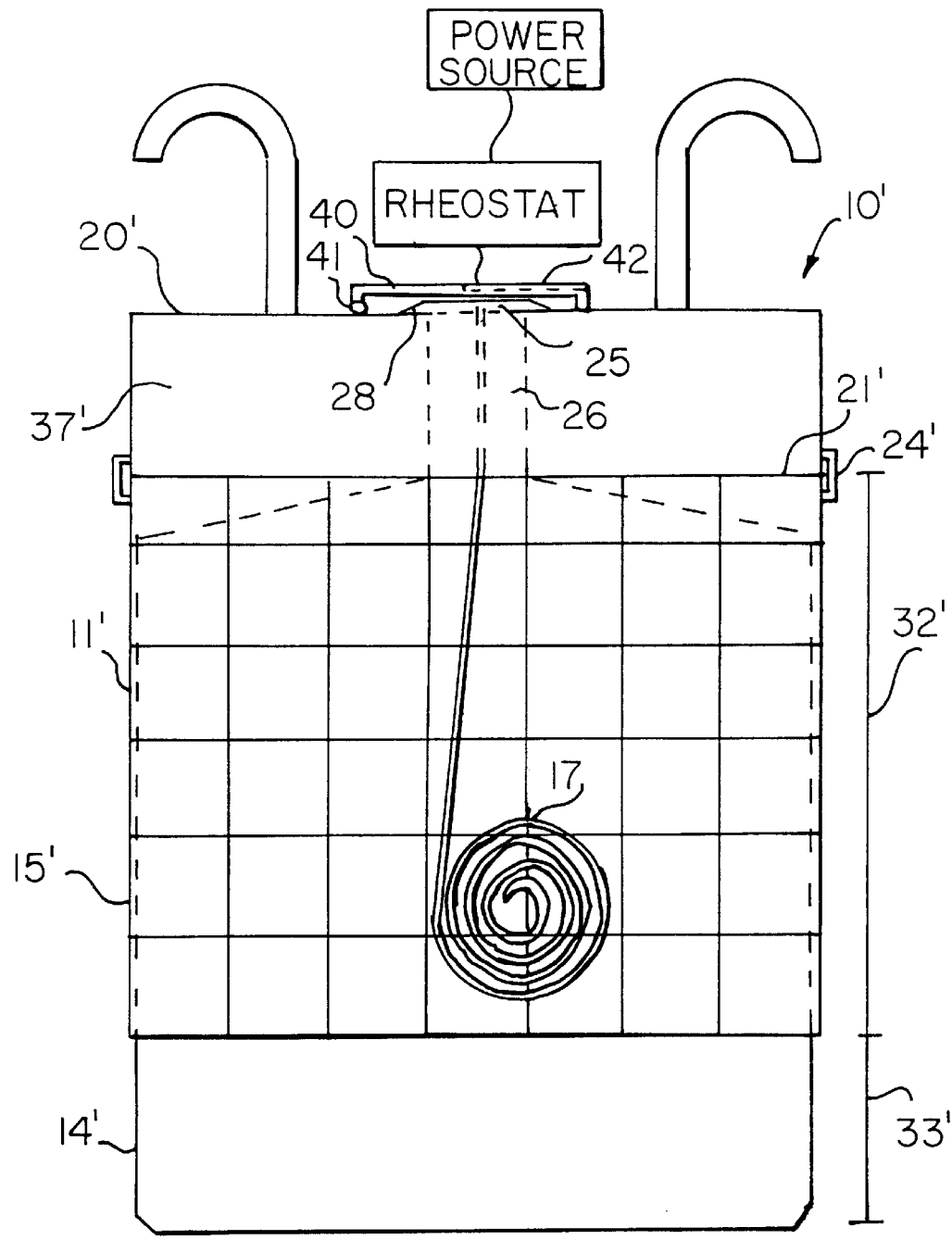
FIG. 2 is a front elevational view showing an alternate embodiment of the apparatus in FIG. 1.

Referring now to FIG. 2, an alternate embodiment of the present invention is shown wherein cage 11' does not completely surround bladder 14'. In particular, cage 11' does not have a base for supporting bladder 14'. Rather, bladder 14' is supported by first support member 37'. Sidewalls 15' of cage 11' extend downwardly from bottom surface 21' of first support member 37' to about two-thirds the height 32' of bladder 14'. Thus, the bottom one-third portion 33' of bladder 14' is exposed. By exposing bottom one-third portion 33' of bladder 14', less wire mesh is required for making cage 11'. Accordingly, the weight of cage 11' supported by clamps 24' to first support member 37' is reduced. Such an arrangement of cage 11' provides for altering the size and shape of bladder 14' without needing to adjust the shape of cage 11'.

Figure 3:
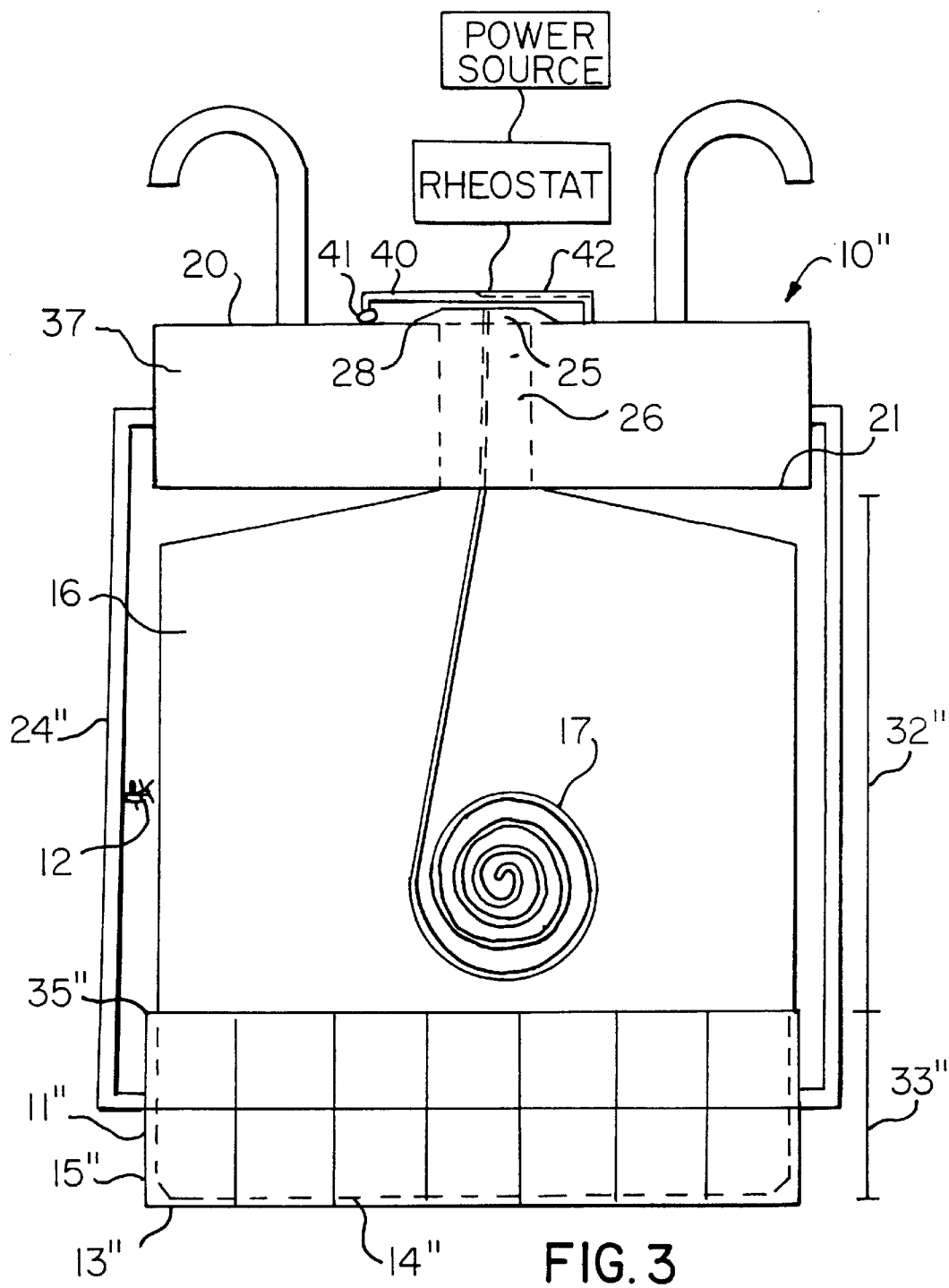
FIG. 3 is a front elevational view showing yet another embodiment of the apparatus in FIG. 1.

Referring now to FIG. 3, yet another embodiment of the present invention is shown where cage 11" includes base 13" and sidewalls 15" for forming a tray-like shape. Second ends 35" of sidewalls 15" extend upwardly from base 13" to along height 33" of bladder 14". The bottom of bladder 14" contacts base 13" and is supported thereon. Thus, the weight of cage 11" is reduced. Clamps 24" preferably extend downward from first support member 37 to sidewalls 15" of cage 11". Clamps 24" secure cage 11" and bladder 14" to first support member 37.

Clamps 24" preferably have wider widths than clamps 24, 24' of previous embodiments discussed above so that clamps 24" will have adequate strength for supporting cage 11" and bladder 14". Such a width of clamp 24" does not block the space surrounding bladder 14" throughwhich flying insects 12 will pass for penetrating bladder 14" and for ingesting liquid insecticide 16. Although bladder 14" is not completely supported by cage 11", bladder 14" maintains its general shape because it is supported by neck portion 28 extending through passageway 26 and securely affixed to top surface 20 of first support member 37.

The present invention will bring needed relief to those who wish to enjoy the outdoors without the hassles of removing dead insects therefrom. The present invention works well in open spaces and may be used in daytime or nighttime. Of course, the present invention may be made in different sizes depending upon the application and the intended location for use.

While the present invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An apparatus for attracting and eradicating flying insects capable of puncturing the skin of humans and animals, said apparatus comprising:
    a bladder having an elastic wall capable of being punctured by proboscis of flying insects and being self-sealing after removal of proboscis of flying insects therefrom, said bladder being adapted to contain a diluted liquid insecticide therein for ingestion by proboscis of flying insects;
    a cage having an open framework for supporting said bladder therewithin;
    at least one hanger attached to said cage adjacent its upper portion for hanging said apparatus therefrom; and
    means positioned generally medially in said bladder and for heating Otis diluted insecticide therein.

2. The apparatus of claim 1, wherein said cage has elongated sidewalls with first and second opposed ends and a base connected to said first end, said sidewalls extending in a generally vertical direction from said base up to said second end.

3. The apparatus of claim 1, wherein said cage is made from wire mesh so that said cage is deformably resilient, said wire mesh being adapted for allowing said flying insects to pass therethrough.

4. The apparatus of claim 1, wherein said wall includes a plurality of pores therein for communicating scent and heat therethrough to attract said flying insects to said liquid insecticide.

5. The apparatus of claim 1, wherein said bladder includes a neck along a vertical axis and for receiving said liquid insecticides therethrough, said neck being formed on top of said bladder so that said liquid insecticide may be poured through said neck and into said bladder in a generally vertical direction.

6. The apparatus of claim 5, wherein said bladder includes a neck and a portion extending from said neck for securing said bladder within said cage.

7. The apparatus of claim 6, wherein said portion of said bladder extending from said neck is removably attached to a top surface of said cage for securing said bladder within said cage.

8. The apparatus of claim 6, wherein said means for heating said liquid insecticide passes downwardly through said neck and remains suspended within said bladder.

9. The apparatus of claim 2, wherein said cage includes a first support member connected to said second end of said sidewalls and having an elongated body with parallel sidewalls and top and bottom surfaces.

10. The apparatus of claim 9, wherein said first support member includes a passageway extending from said top surface down through said body to said bottom surface, said first support member for directing said means for heating down through said neck and into said bladder so that said means for heating does not come into contact with said wall of said bladder, said portion of said bladder extends outwardly from said passageway and removably attaches to said top surface for securing said bladder within said cage.

11. The apparatus of claim 10, further including a cap engaging said top surface, said cap positioned above and along said passageway for preventing said liquid insecticide from evaporating.

12. The apparatus of claim 1, wherein said means for heating comprises:
    a heating coil for conducting heat and thereby heating said liquid insecticide for attracting flying insects, said heating coil being flexible for fitting through a passageway of said cage and for expanding within said bladder;
    a rheostat connected to said heating coil and for adjusting a temperature of said heating coil; and
    a power source connected to said rheostat and for supplying power to said heating coil.

13. The apparatus of claim 12, wherein said heating coil is coated with an insulating material.

14. The apparatus of claim 12, wherein said power source is an alternating current power source.

15. The apparatus of claim 12, wherein said power source is a direct current power source.

16. The apparatus of claim 1, wherein said liquid insecticide is heated to a temperature between about 95 degrees Fahrenheit to 102 degrees Fahrenheit.

17. The apparatus of claim 2, wherein said cage includes a first support member having first and second opposed ends, a plurality of clamps for connecting said first support member to said cage so that said cage adequately supports said bladder therewithin, said plurality of clamps selectively engaging said first and second opposed ends of said first support member.

18. The apparatus of claim 1, further comprising a second support member for receiving said at least one hanger, said second support member being adapted for suspending said apparatus above ground.

19. The apparatus of claim 1, wherein said bladder has first and second portions so that said cage surrounds said first portion thereby leaving said second portion exposed and not supported within said cage.

20. The apparatus of claim 19, wherein said cage surrounds said second portion thereby leaving said first portion exposed and not supported within said cage.

21. The apparatus of claim 1, wherein said wall of said bladder is between about 0.005 inches to 0.020 inches thick.

22. The apparatus of claim 1, wherein said liquid insecticide comprises between about 8 to 10 drops of Diazinon and water mixed therewith.

23. The apparatus of claim 1, wherein said liquid insecticide comprises between about 8 to 10 drops of Lindane and water mixed therewith.

24. The apparatus of claim 1, wherein said bladder is formed from animal skin having a thickness of less than about 0.009 inches.

25. The apparatus of claim 1, wherein said bladder is formed from VTR rubber having a thickness of less than about 0.013 inches.

\* \* \* \* \*